United States Patent [19]
Mochizuki et al.

[11] Patent Number: 5,353,830
[45] Date of Patent: Oct. 11, 1994

[54] APPARATUS FOR AUTOMATICALLY SWITCHING CONDUIT PIPES OF LIQUID TREATING PLANT

[75] Inventors: Shigetoshi Mochizuki; Hironori Kitazaki; Masaaki Mori, all of Fujieda; Michio Nagasawa, Tokyo; Yoshihiko Akiyama, Fujieda; Hiroaki Naruse, Fujieda; Mitsunori Miyazawa, Fujieda; Kiyoshi Mochizuki, Fuji, all of Japan

[73] Assignee: Tsumura Co., Ltd., Tokyo, Japan

[21] Appl. No.: 838,257

[22] PCT Filed: Nov. 14, 1990

[86] PCT No.: PCT/JP90/01476

§ 371 Date: Mar. 10, 1992

§ 102(e) Date: Mar. 10, 1992

[87] PCT Pub. No.: WO92/01182

PCT Pub. Date: Jan. 23, 1992

[30] Foreign Application Priority Data

Jul. 10, 1990 [JP] Japan .................. 2-182454

[51] Int. Cl.5 ............... B08B 3/02; B08B 9/06
[52] U.S. Cl. .................. 137/240; 53/168; 134/104.1; 134/167 C; 141/91
[58] Field of Search .......... 137/237, 238, 240, 625.11; 222/148; 53/168, 425, 426; 134/104.1, 167 C, 168 C; 141/90, 91

[56] References Cited

U.S. PATENT DOCUMENTS

| 4,417,610 | 11/1983 | Waldström et al. | 141/91 |
| 4,419,376 | 12/1983 | Hersom et al. | 53/425 |
| 4,506,491 | 3/1985 | Joosten et al. | 53/426 |
| 4,524,563 | 6/1985 | Sassi | 53/426 |
| 4,540,015 | 9/1985 | Henriksen et al. | 137/625.11 |
| 4,683,701 | 8/1987 | Rangwala et al. | 53/426 |
| 4,993,598 | 2/1991 | Groninger | 141/91 |
| 5,127,429 | 7/1992 | Kempf et al. | 137/240 |
| 5,230,373 | 7/1993 | Engler | 141/91 |

FOREIGN PATENT DOCUMENTS

| 46-35309 | 10/1971 | Japan . | |
| 50-1098 | 1/1975 | Japan . | |
| 0304275 | 12/1990 | Japan | 137/237 |
| 0304276 | 12/1990 | Japan | 137/237 |

Primary Examiner—George L. Walton
Attorney, Agent, or Firm—Oblon, Spivak, McClelland, Maier & Neustadt

[57] ABSTRACT

An apparatus for automatically switching of connection of conduit pipes to clean the pipe lines in a liquid treating plant, to control centrally the automatically switching from a remote place, portions to be washed by a cleaning liquid and the other portions desired to be kept free from a cleaning liquid being separated, the apparatus comprizing a plurality of pipes (11a, 11b, 11c, 11d) of pipe lines which have openings on a circle on a fixed plate (10), switching pipes (17a, 17b) connecting the pipes (11a, 11b, 11c, 11d) to each other at the openings, nozzles (34) to spray a cleaning liquid toward the switching portions of pipes being located in an axis of the circle, the switching pipes and nozzles being substantially arranged in a body and covered with a cover (45), and on the opposite side of the fixed plate (10) where a spraying cleaning liquid is shut by the fixed plate, a drive mechanism (2) which switches the connection of pipes by linearly reciprocating and rotating the switching pipes and nozzles is provided.

8 Claims, 7 Drawing Sheets

APPARATUS FOR AUTOMATICALLY SWITCHING CONDUIT PIPES OF LIQUID TREATING PLANT

BACKGROUND OF THE INVENTION

1. Field of the Invention

This invention relates to an apparatus for automatically switching connections of conduit pipes of a liquid treating plant useful in various manufacturing processes in the fields of foods, pharmaceutics, cosmetics, chemicals or the like.

2. Description of the Prior Art

In a liquid treating plant for food or chemical products, for example, there often arises a necessity for periodically cleaning and sterilizing a number of conduit pipes with a cleaning liquid or steam which is supplied thereto through a multiple-point conduit switching apparatus.

As regards the conduit switching apparatus which serves for this purpose, there are known technologies as described, for instance, in Japanese Patent Publications 46-35309 and 50-1089. The conduit switching apparatus of these prior art publications are generally constituted by a fixed plate having switch ports on its surface in communication with a plural number of conduit pipes, a movable member with a number of U-shaped switch pipes having open ends thereof disposed in face to face relation with the ports in the fixed plate, and a drive mechanism adapted to drive the movable member for linear reciprocating movements and rotational or angular rocking movements relative to the fixed plate, switching connections of the conduit pipes by combination of the linear reciprocating movements and the rotational rocking movements of the movable member relative to the fixed plate.

A problem with the conduit switching operations is that liquid leaks take place at the conduit switch points where the switch ports of the conduit pipes are selectively connected by the switch pipes, necessitating to wash the switch points with a cleaning liquid, which however scatters around and tends to cause troubles to the drive mechanism and controlling electrical wiring for the movable member as well as to support structures of the movable member and various metering instruments, making it extremely difficult to perform the multiple-point conduit switching operations under centralized control from a remote place. On the other hand, especially in case of a liquid treating plant for a food or chemical product, the washing operation relying on human manual labor is undesirable from the Viewpoint of sanitariness and contamination with microorganisms.

In this regard, the afore-mentioned Japanese Patent Publication 46-35309 proposes to use, for washing the conduit switch points, a sprayer located over a cover which encloses the switch points. However, a sprayer of this sort fails to clean the switch points of conduits to a sufficient degree, in addition to a problem that the washing operation is time-consuming.

Further, a number of problems have to be solved before realization of automatic conduit switching operation. For example, when the switching ports of conduit pipes are opened for the switching operation, the seal packings which are provided at the switching points often fall off, and this trouble is conspicuous especially in case of conduits which convey a highly viscous liquid or which have a high internal pressure. Manually remounting the fallen-off packings is not only troublesome but also undesirable in a liquid treating plant of food or pharmaceutical products in view of the possibilities of secondary contamination with microorganisms of the liquid under treatment through contact with human body.

The liquid leaks from the switch points of the conduit pipes also take place as a result of damages to or ageing of the seals or packings at the switch points.

Such liquid leakage at the switch points has to be detected promptly in case of a liquid treating plant for food or pharmaceutical product to preclude the possibilities of the secondary contamination with microorganism. Further, when the movable member proceeds to a next action prematurely for some reason without completing a predetermined stroke, this has to be detected promptly in a reliable manner.

SUMMARY OF THE INVENTION

It is a primary object of the present invention to provide an apparatus for automatically switching conduit pipes of a liquid treating plant under centralized control from a remote place, separating the parts to be washed by a washing device from those parts which are desired to be kept free of a cleaning liquid.

It is another object of the invention to provide an apparatus for automatically switching conduit pipes as mentioned above, including a washer assembly capable of washing off liquid leaks at switch points to a sufficient degree within a shortened period of time.

It is still another object of the invention to provide an apparatus for switching conduit pipes as mentioned above, including a seal mechanism suitable for the automatic switching operation, precluding the possibilities of seal packings falling off at the time of washing operation and permitting easy replacement of the seal packings.

It is a further object of the invention to provide an apparatus for automatically switching conduit pipes as mentioned above, including means for promptly detecting liquid leaks at switch points, if any, through effective use of equipments which are provided to prevent scattering of the washing liquid.

It is a further object of the invention to provide an apparatus for automatically switching conduit pipes as mentioned above, including a drive mechanism which is simplified and compact in construction and permits to mount various operating position sensors collectively in a position favorable in terms of stable operations.

In accordance with the present invention, there is provided, for achieving the above-stated objectives, an apparatus for automatically switching conduit pipes of a liquid treating plant, including a fixed plate supporting a plural number of conduit pipes thereon in communication with corresponding switch ports opened on one side of the fixed plate in spaced positions on a predetermined circle, a movable switch member supporting thereon U-shaped switch pipes with opposite open ends thereof in face to face relation with the switch ports on the fixed plate at predetermined switch points, and a drive mechanism having a drive shaft extended through the center of the circle of switch port positions on the fixed plate and adapted to drive the movable switch member for linear reciprocating movements toward and away from the fixed plate and rotational or angular rocking movements about the axis of the drive shaft, switching the connection of the conduit pipes by a combination of the linear reciprocating movements and rotational movements of the movable switch plate relative to the fixed plate, characterized in that the automatic switching apparatus comprises: a washer assembly mounted on the drive shaft and having a number of nozzles for spraying a washing liquid to wash the switch points; and a cover enclosing switch points on the side of the switch ports on the fixed plate; the drive mechanism having a fluid cylinder and a rotary actuator located on the other side of the fixed plate away from the switch ports to impart the linear reciprocating movements and rotational movements to the movable member; the fixed plate also having a function as a partition wall for protecting the drive mechanism against intrusion of the washing liquid from the washer assembly.

In the automatic conduit switching apparatus of the above-described arrangement, the movable member is linearly reciprocated toward and away from the fixed plate by the fluid cylinder and at the same time rotated relative to the fixed plate by the rotary actuator, thereby automatically switching the connections of the conduit pipes by changing the position of the U-shaped switch pipes on the movable member. The above-mentioned various problems arising from the automatic switching operation are solved by the specific arrangements of the co-operating parts.

More specifically, the liquid leaks which take place at the switch points at the time of conduit switching operation are washed off by the washing liquid spurted from the washer nozzles, which are located in proximate positions to spurt the washing liquid accurately toward the respective conduit switch points. Besides, the drive shaft and the movable member are integrally put in linear reciprocating movements and rotational movements, so that, in spite of the switching operation, no great changes occur to the positional relationship between the switch points and the washer nozzles, sweeping instead those portions which need a wash and thus washing the switch points of conduits to a sufficient degree in a shortened period of time.

In addition, in the automatic washing stage of the conduit switching operation, the fixed plate and the cover on the fixed plate prevent the washing liquid from scattering out of a washing area, thereby protecting the fluid cylinder and rotary actuator, electrical wiring for the control of the drive mechanism, support structures for the movable member and various metering instruments against the splashes of the washing liquid. Consequently, it becomes possible to switch the conduit pipes of a liquid treating plant automatically under centralized control from a remote place.

Since the operator remains out of contact with the conduit pipes being switched, the above-described arrangement contributes to prevent secondary contamination with microorganisms or the like.

Further, in accordance with the present invention, the hood which is mounted on the fixed plate to cover the switch points may be provided with a liquid collecting groove for receiving the liquid leaks from the switch points, along with a leak sensor which is located within the liquid collecting groove for detecting leaks of the processing liquid.

Preferably, the automatic conduit switching apparatus of the invention further includes a seal packing at each switch point, the seal packing being constituted by an axially disposed cylindrical member having a seal portion at the fore end thereof, and a radially bent member formed integrally with the cylindrical member and gripped between an end of the switch pipe and a packing holder threaded on the switch pipe.

The seal packing of the foregoing construction, having the radially bent portion gripped between an end of the switch pipe and the packing holder, is capable of preventing the seal packing from falling off upon opening the switch port by automatic operation even when the processing liquid has a high viscosity or when the conduit has a high internal pressure. At the same time, the seal portion which is formed at the fore end of the axial cylindrical member prevents positional deviations of fore end portions of the packings at the time of coupling to seal the switch points securely while preventing liquid leaks from the switch points subsequent to an automatic switching operation.

On the other hand, the drive mechanism of the automatic conduit switching apparatus according to the invention is constituted by a dual actuator, more specifically, a fluid cylinder having a hollow reciprocating piston which is permitted of reciprocating sliding movement but blocked against rotational movement and has its output shaft coupled with a center portion of the movable member, and a rotary actuator having a vane mounted on the output shaft within the piston for rotational drive of the output shaft.

The above-described dual actuator which has the fluid cylinder and rotary actuator in an integrated form contributes to simplification and compactness in construction of the apparatus. In this connection, the piping for the operating fluid can also be simplified in a case where it is arranged to supply the operating fluid through guide rods connected to the piston. Further, in a case where operating positions of the movable member in the axial and rotational directions are detected by the use of the output shaft of the rotary actuator which is led out of the cylinder and associated with suitable sensors, the maintenance of the sensors becomes easier, and the operating position of the movable member can be detected in a stabilized state.

BRIEF DESCRIPTION OF THE DRAWINGS

The above and other objects, features and advantages of the invention will become apparent from the following description and the appended claims, taken in conjunction with the accompanying drawings which show by way of example preferred embodiments of the invention and in which:

BEST MODE FOR CARRYING OUT THE INVENTION

Figure 1:
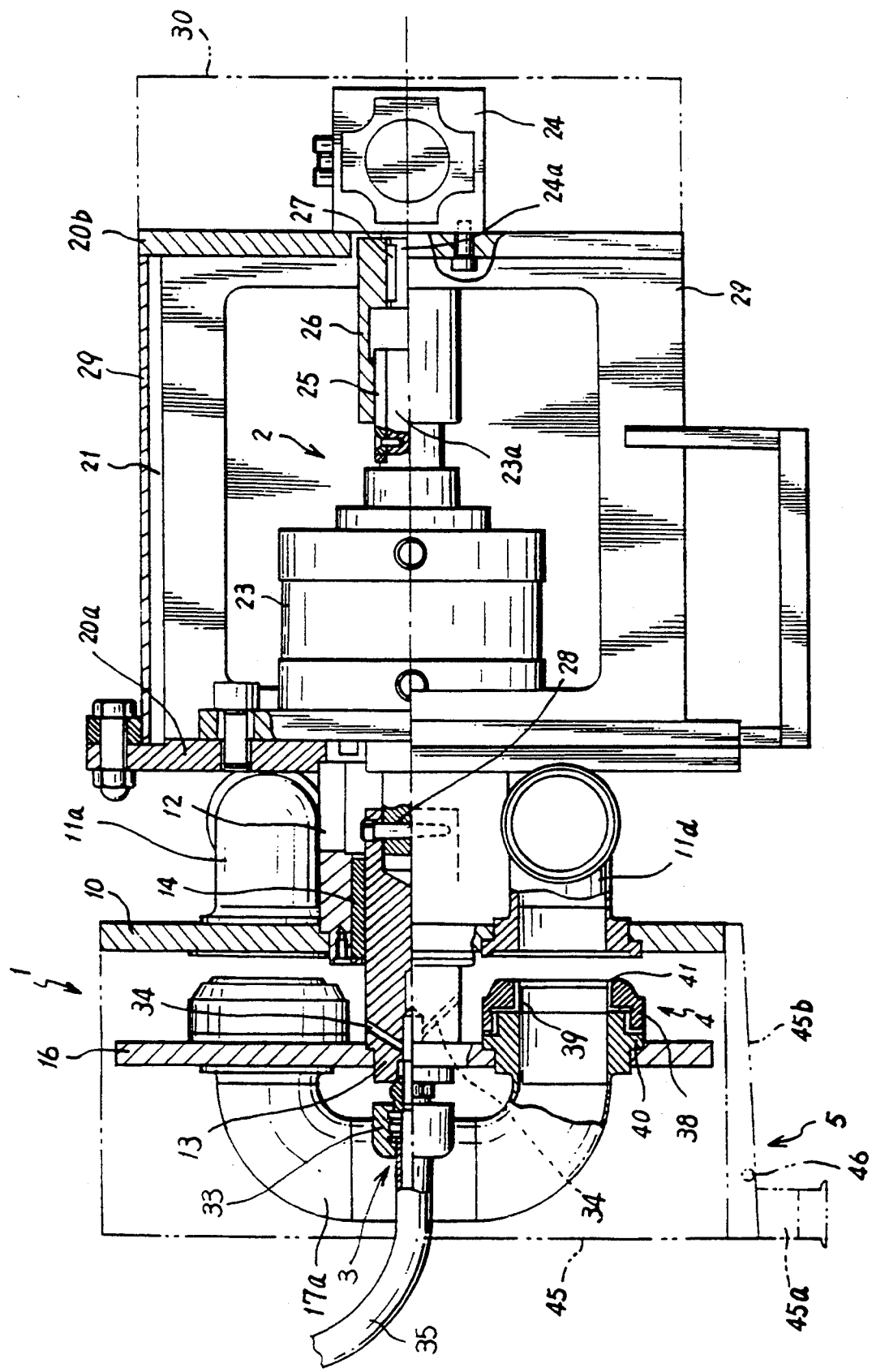
FIG. 1 is a schematic side view partly in vertical section of a first embodiment of the automatic conduit switching apparatus according to the invention.
Figure 2:
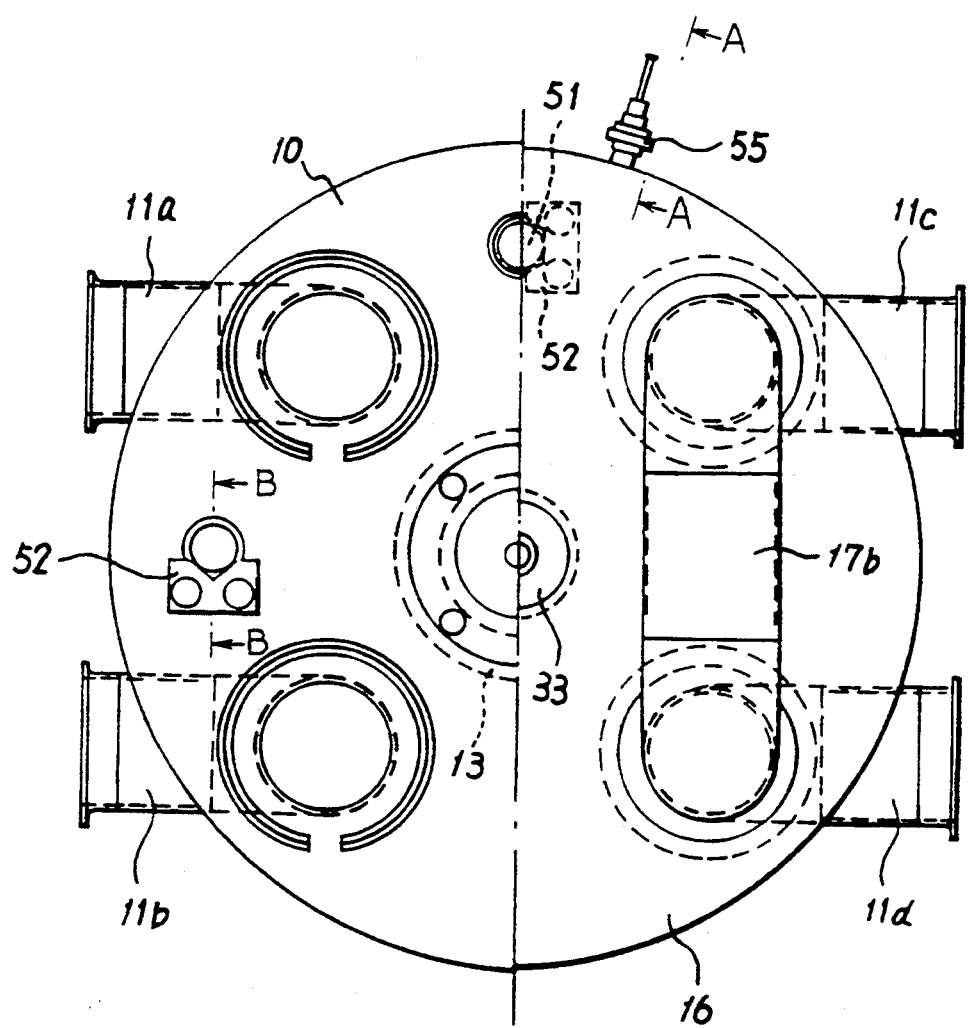
FIG. 2 is a partly cutaway front view of the switching apparatus.

Referring to FIGS. 1 and 2, there is shown the general arrangement of the automatic conduit switching apparatus in the first embodiment of the invention, which includes as major components a quadrupole two-way conduit switch 1, a drive mechanism 2 for driving the switch 1, a washer assembly 3 for washing off dribbling liquid at conduit switch points, a seal assembly 4 for sealing the conduit switch points, a leak sensor 5 for detecting liquid leakage at the conduit switch points, and a control unit 7 (FIG. 10) for controlling operations of the various mechanisms mentioned above.

The switch 1 includes a fixed plate 10 which is fixedly mounted on a machine frame and provided with a plural number of switch ports in equidistant positions around a circle on one face of the fixed plate 10 in communication with one end of conduit pipes 11a to 11d, respectively. The other bent ends of the pipes 11a to 11d are opened in the opposite directions for connection to conduit pipes (not shown) of a food or pharmaceutical processing system or a washing liquid supply system.

For linear reciprocating movement and rotary or angular rocking movement, a rocking shaft 13 is mounted through a bearing 14 in a sleeve 12 which is fixedly mounted at the center axis of the fixed plate 10, namely, at the center of the circle around which the ports of the conduit pipes are arranged. A movable member 16 which is centrally fixed on one end of the rocking shaft 13 supports thereon a pair of U-shaped switch pipes 17a and 17b with the opposite open ends thereof disposed in face to face relation with the switch ports for the conduit pipes 11a to 11d.

Provided on the rear side of the fixed plate, remote from the switch ports, is a support structure for the conduit switching apparatus, including a mounting plate 20a which is securely connected to the afore-mentioned sleeve 12, a second mounting plate 20b located in an axially spaced position relative to the first mounting plate 20a, and a machine frame 21 interconnecting the first and second mounting plates. A fluid cylinder 23 and a rotary actuator 24 are fixedly mounted on the mounting plates 20a and 20b, respectively. Rod 23a of the fluid cylinder 23 and shaft 24a of the rotary actuator 24 are coupled with each other through a coupling 26 which is mounted on the shaft 24a through a key 27 in such a manner as to permit integral rocking movement and relative reciprocating movement of the rod 23a through a key 25. The rod 23a and the rocking shaft 13 are connected to each other by a taper pin 28 for integral rocking and reciprocating movements.

Accordingly, in the above-described drive mechanism, as the rocking actuator 24 is actuated, its rotational movement is transmitted to the rocking shaft 13 through the rod 23a of the fluid cylinder 23, causing the movable member 16 to turn relative to the fixed plate 10. When the fluid cylinder 23 is actuated, axial motion is transmitted to the rocking shaft 13 to move the movable member 16 toward or away from the fixed plate 10.

The fluid cylinder 23 and the rocking actuator 24 are enclosed in covers 29 and 30, respectively, which are mounted on the machine frame 21.

Figure 3:
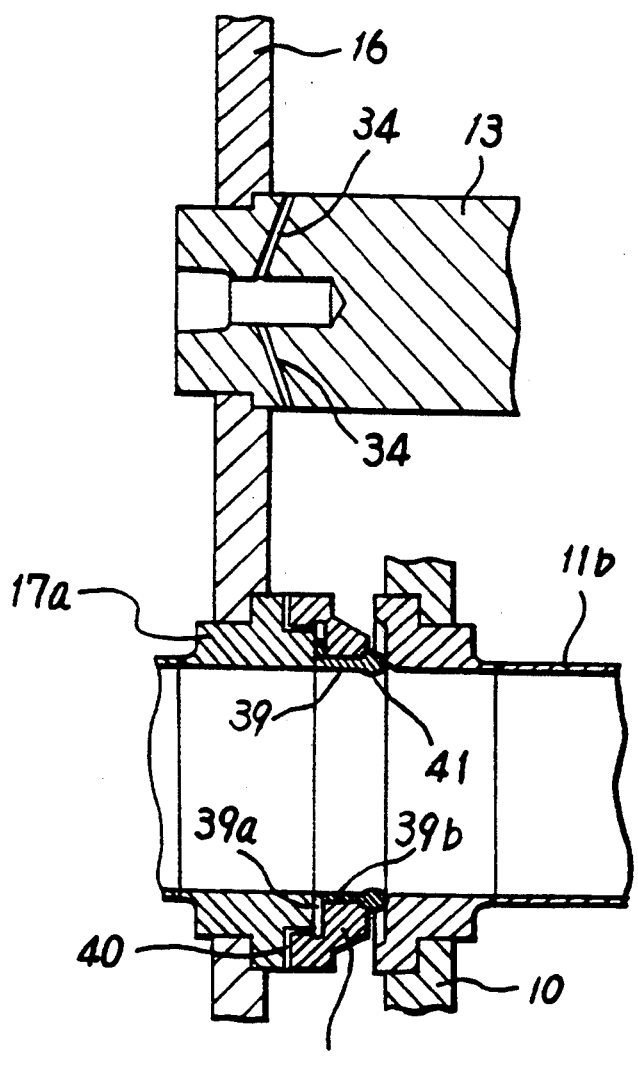
FIG. 3 is an enlarged sectional view of a washer assembly and a seal assembly.

As seen in FIGS. 1 and 3, the washer assembly 3 includes a coupler 33 which is threaded on the tip end of the rocking shaft 13, and a plural number of nozzles 34 which are in communication with the coupler 33 and opened radially outward of the rocking shaft 13 to spurt a washing liquid toward the conduit switch points. The washing liquid which is supplied to the coupler 33 through a flexible tube 35 is spurted toward the switch points where the switch ports of the conduit pipes 11a to 11d are joined with the switch pipes 17a and 17b, thereby to wash off the dribbling liquid at opened switch points. Accordingly, jets of the washing liquid can be directed exactly toward the switch points from a proximate position to wash off the dribbling liquid to a sufficient degree within a short time period, in spite of rotation of the movable member 16 since the respective nozzles 34 remains in the same positional relations with the switch ports of the conduit pipes.

The washing liquid feed pipe 35 is flexible as mentioned hereinbefore, so that the rotary motions of the movable member 16 cause no trouble to the supply of the washing liquid.

As shown particularly in FIG. 3, the seal assembly 4 is provided with seal packings 39 of L-shape in section which are gripped between the open ends-of the switch pipes 17a and 17b and packing holders 38 threaded on the just-mentioned open ends of the switch pipes. The seal packings 39 are each constituted by an L-shape body of a resilient material having a flange-like radial portion 39a formed integrally with a cylindrical axial portion 39b which is provided with a bulged seal portion 41 at its distal end for sealing the switch ports of the conduit pipes 11a to 11d.

The seal packing 39 is mounted at the open end of each switch pipe 17a or 17b with its radial portion 39a gripped between the switch pipe 17a or 17b and the packing holder 38, the joint of which is in turn sealed with a gasket 40. The switch ports are sealed stably by the seal portion 41 because the seal packings 39 are securely retained on the tip ends of the switch pipes 17a and 17b, without falling off upon opening the switch points even in a case where the conduit pipes convey a liquid of high viscosity or pressure. In case of deterioration by ageing, the packing holer 38 can be easily removed for replacement of the seal packing 39.

Figure 6:
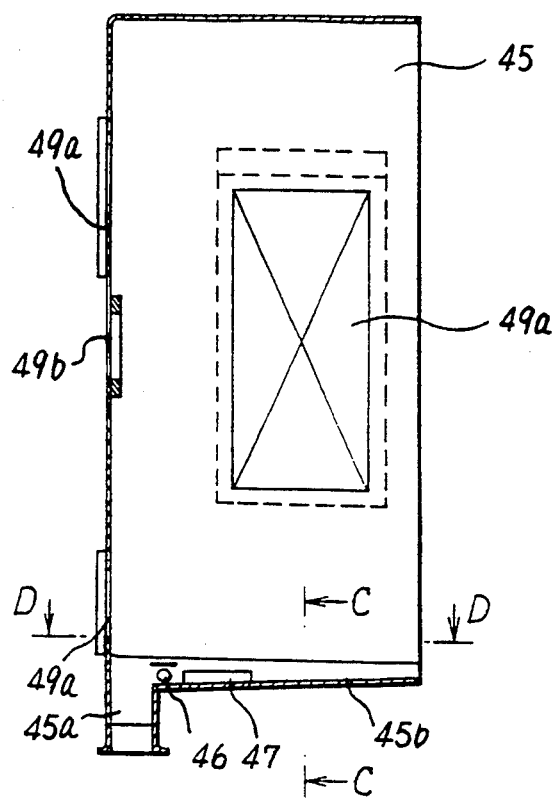
FIG. 6 is a sectional view of a cover attached to the fixed plate on the side of the washer assembly.

The fixed member 10 also functions as a partition plate which prevents intrusion of the washing liquid to the side of the drive mechanism from the washing zone on the other side of the fixed member 10. For this purpose, as seen in FIGS. 1 and 6, a cover 45 which encloses the switch points and washing zone is mounted around the circumference of the fixed plate 10 liquid-tight and detachably by means of screws or other suitable fixation means.

Figure 7:
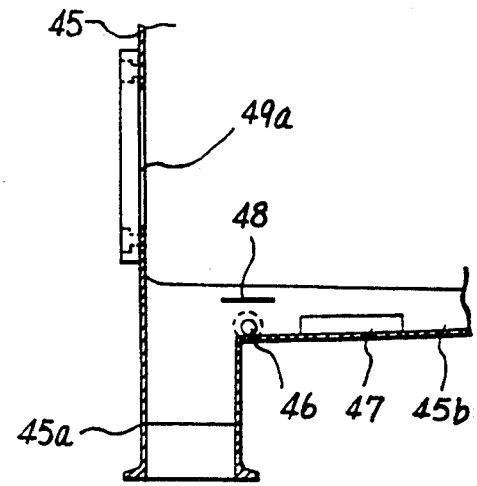
FIG. 7 is a fragmentary sectional view on an enlarged scale of the cover.
Figure 8:
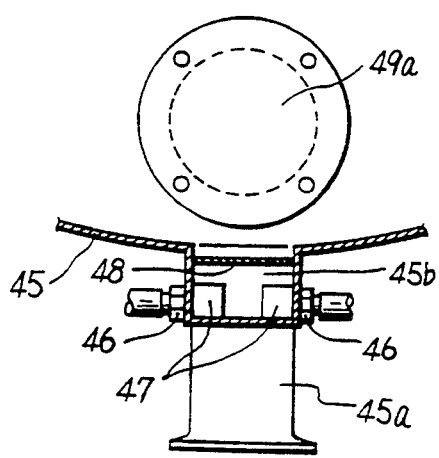
FIG. 8 is an enlarged sectional view taken on line C—C of FIG. 6.
Figure 9:
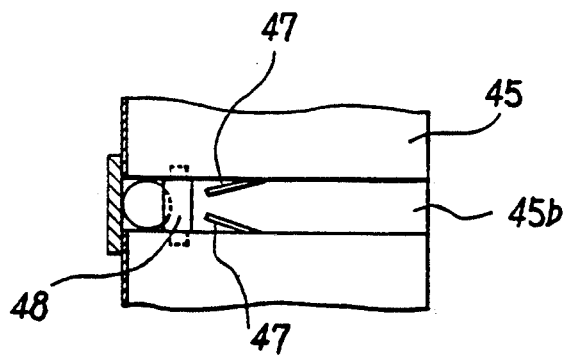
FIG. 9 is a sectional view taken on line D—D of FIG.

The cover 45 cooperates with the fixed plate 10 in preventing splashes of the washing liquid of the washer 3 from falling on the drive mechanism 2 or other components to be kept free of the splashes, and also in preventing the washing liquid from scattering outside the washing zone at the time of opening the switch points where the conduit pipes 11a to 11d are joined with the switch pipes 17a and 17b, while preventing secondary contamination with microorganisms which might take place as a result of contact of the switching points with the air outside the washing zone or with an operator. As shown particularly in FIGS. 7 to 9, the cover 45 is provided with a drain pipe 45a at its bottom for discharging the washing liquid therethrough, in communication with a liquid collecting gutter 45b which is inclined toward the drain pipe 45a. A leak sensor 46 is located on the bottom surface of the gutter 45b to detect liquid leaks from the switch points, in combination with liquid collector plates 47 which serve to concentrate leaked liquid toward the sensors 46. The leak sensors 46 are located under a protective cover plate 48 which prevent erroneous operations of the sensors 46. As shown in FIG. 6, the cover 45 is further provided with a suitable number of observation windows 49a for eye inspection of the operating condition of the washer assembly 3 and the leakage to the collecting gutter 45b, along with an opening 49b for receiving the washing liquid feed tube 35 which supplies the washing liquid to the coupler 33.

The above-mentioned leak sensor 46 is constituted, for example, by an optical fiber sensor of the type which is resistant to chemicals, heat (up to about 200° C.) and water, and adapted to detect variations which occur in the amount of light cast to a light-receiving element along a light path across the collecting gutter 45b as a result of passage of leaked liquid across the light path. For this purpose, a pair of electrodes may be located opposingly across the collecting gutter 45b to detect a flow of liquid by way of electric conduction which takes place across the two electrode as the liquid contact therewith. These leak sensors 46 are desired to be adjustable in detection sensitivity. Each sensor 46 is connected to an alarm device, not shown, to give off an alarm sound or to light up an alarm lamp upon detection of liquid leakage. The cover plate 48 serves to prevent erroneous operations of the sensors 46 which might otherwise be caused by falling droplets of the washing liquid.

It is necessary to stop operation of the leak sensors 46 while the switch points of the conduits are being washed, by the use of a timer or other suitable means.

Figure 4:
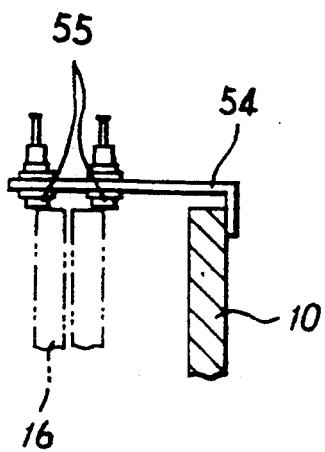
FIGS. 4 and 5 are sectional views taken on lines A—A and B—B of FIG. 2, respectively.
Figure 5:
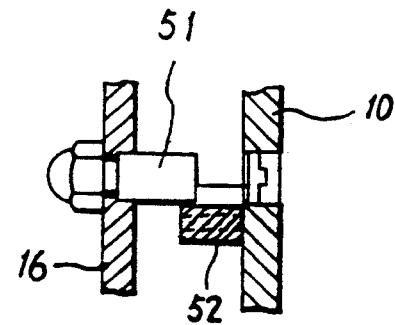

As seen in FIGS. 2, 4 and 5, a rod 51, which constitutes part of a position sensor mechanism, is provided on the movable member 16 opposingly to the fixed plate 10, for abutting engagement with stopper blocks 52 which are fixed on the part of the fixed plate 10. The angular rotational movement of the movable member 16 is thus restricted by abutting engagement of the rod 51 against the stopper blocks 52. On the other hand, the linear reciprocating movement of the movable member 16 is detected by a pair of approaching switches 55 which are fixedly mounted on the fixed plate 10 through a bracket 54, while its angular rotational movement is detected by a pair of approaching switches 56 (FIG. 6) which are mounted on the rotary actuator 24. Thus, the afore-mentioned position sensor mechanism is constituted by the rod 51, stopper blocks 52 and paired approaching switches 55 and 56. The approaching switches 55 need to be of water-proofing type which can be exposed to splashes of the washing liquid.

Figure 10:
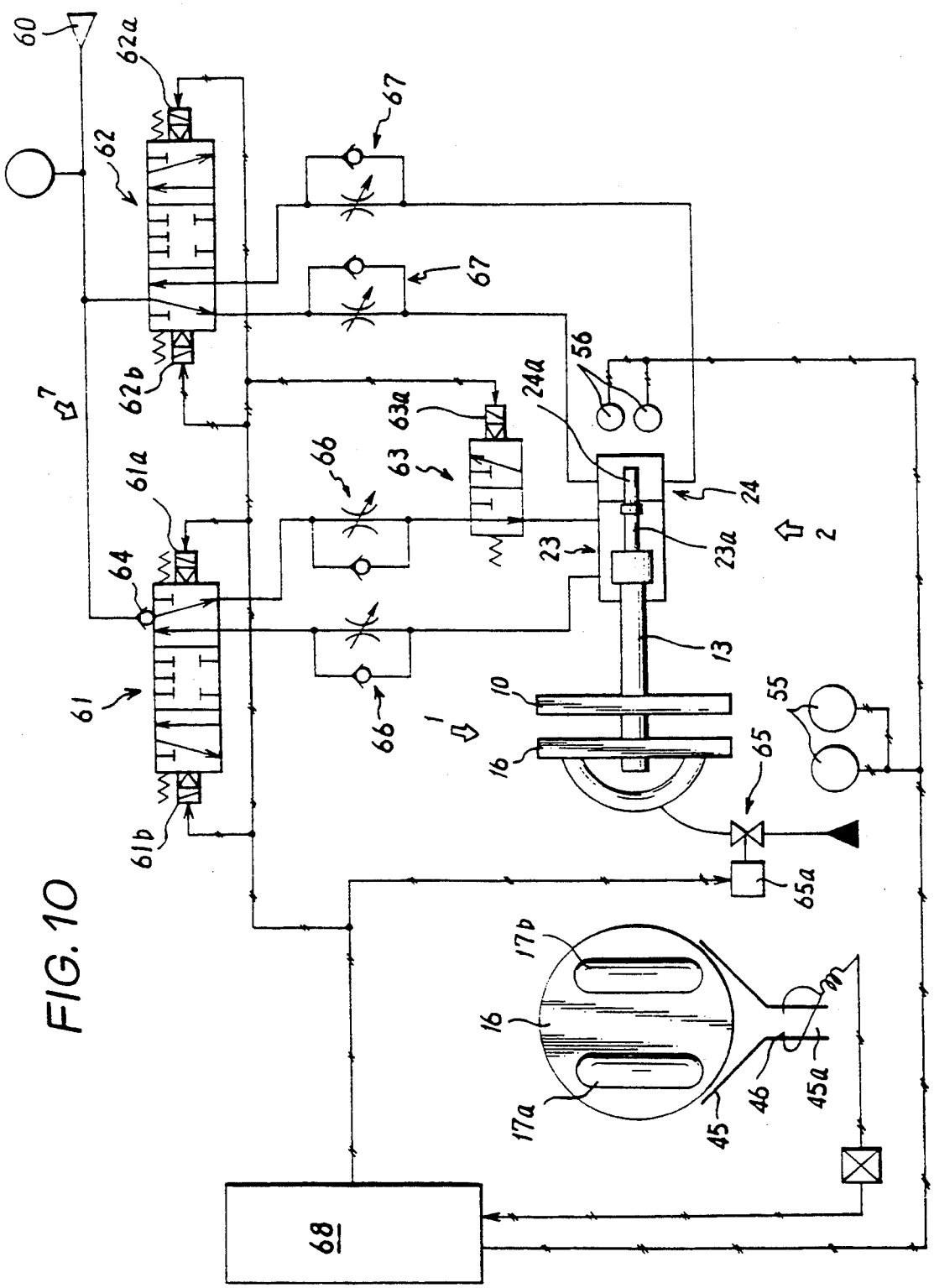
FIG. 10 is a diagram of a controller employed in the automatic conduit switching apparatus of the first embodiment.

The control unit 7 shown in FIG. 10 includes: a first direction change-over valve 61 which controls supply of compressed air from an air source 60 to the fluid cylinder 23; a second direction change-over valve 62 which controls supply of compressed air to the rotary actuator 24; an on-off valve 63 provided in a passage which communicates an output port of the first direction change-over valve 61 with a pressure chamber of the fluid cylinder 23 to drive the rod 23a in a direction of opening the movable member 16; a check valve 64 provided in a passage which communicates the air source 60 with an input port of the first direction change-over valve 61 to block reverse flows of compressed air; an on-off valve 65 which controls supply of clean water; and speed controllers 66 to 67 provided in passages which communicate the output ports of the first and second direction change-over valves 61 and 62 with the fluid cylinder 23 and rotary actuator 24. The first and second direction change-over valves 61 and 62 are of the center closed type which closes all ports in neutral position, and the valves 61 to 63 and 65 are operated from a control panel 68 under programmed control as will be explained hereinlater.

The operation of the above-described embodiment is now described with reference to FIG. 10.

As solenoid 61a of the first direction change-over valve 61 is energized by an electric signal from the control panel 68, the rod 23a of the fluid cylinder 23 is moved to the left in FIG. 1, moving the movable member 16 in a direction away from the fixed plate 10.

This movement of the movable member 16 is detected by the approaching switch 55, whereupon solenoid 63a of the on-off valve 63 is energized and the solenoid 61a is deenergized, discharging the operating compressed air of the fluid cylinder 23 to the outside. Therefore, the fluid pressures in the pressure chambers on the opposite sides of the piston of the fluid cylinder 23 equalize in a predetermined open period. Nextly, after de-energizing the solenoid 63a of the on-off valve 63, solenoid 62a of the second direction change-over valve 62 is energized to turn the rotary actuator 24. At this time, since no axial pressure is acting on the fluid cylinder 23, the rocking shaft 13 and movable member 16 are turned through about 90 degrees by the rotary actuator 24 of small torque. It follows that the rotary actuator 24 may be of small size.

As soon as a predetermined angular rotation of the movable member 16 is detected by the approaching switch 56, the solenoid 62a is de-energized to return the second direction change-over valve 62 to neutral position, while the rotary actuator 24 is retained in the angularly rotated position by compressed air prevailing in the actuator.

After returning the second direction change-over valve 62 to neutral position, the solenoid 61b of the first direction change-over valve 61 is energized, whereupon the rod 23a of the fluid cylinder 23, rocking shaft 13 and movable member 16 are moved to the right in FIG. 1 to switch the connections of the conduit pipes.

After this, solenoid 65a of the on-off valve 65 is energized to spout the washing liquid through a large number of nozzles 34 to wash away the liquid which had dribbled from the switch ports in the open phase of the operation, discharging the used washing liquid through the drain pipe 45a. Upon lapse of a predetermined time period, the solenoid 65a is de-energized to stop the washing operation.

The reverse conduit switching operation is effected substantially in the same manner except that the movable member 16 is turned in the opposite direction, so that detailed description in this regard is omitted to avoid repetitions.

After switching the conduits and washing away the dribbled liquid in the above-described manner, a washing liquid, steam or the like is supplied through pipes connected to the conduit pipes 11a to 11d to clean or sterilize the conduits of the liquid processing plant.

Figure 11:
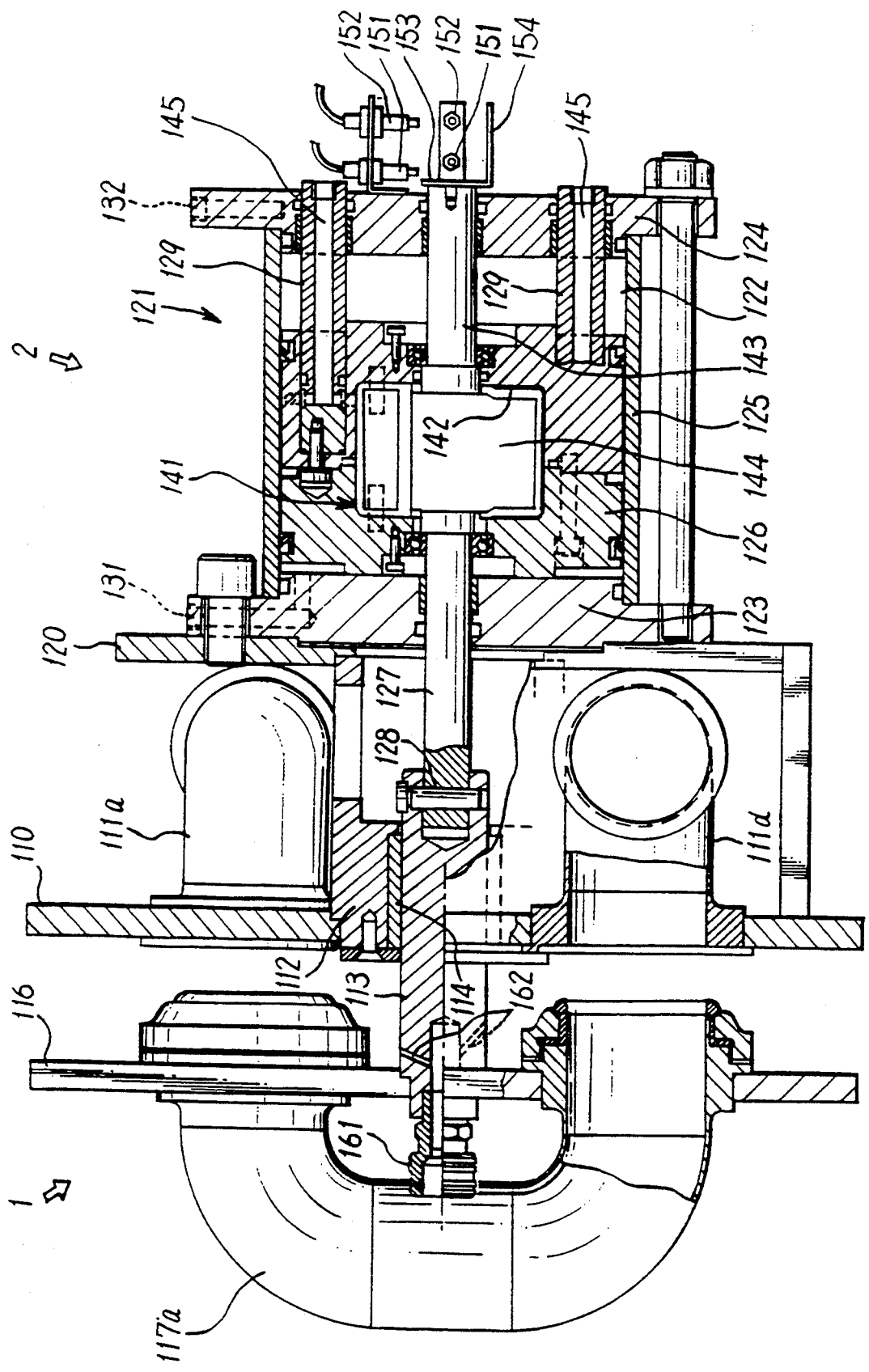
FIG. 11 is a schematic side view partly in section of a second embodiment of the automatic conduit switching apparatus of the invention.

Illustrated in FIG. 11 is a second embodiment of the invention employing a drive mechanism different from that of the first embodiment. More specifically, similarly to the first embodiment, the automatic conduit switching apparatus of this embodiment is largely composed of a switch assembly 1 for changing the connections of conduit pipes, a drive mechanism 2 for driving the switch 1, a washer assembly 3 for cleaning off drooling liquid at the switch ports, a seal assembly 4 for sealing the switch ports, a leak sensor 5 for detecting leaks from the seal assembly 4, and a control unit 7 (FIG. 12) which controls the operations of these components.

A rocking shaft 113 which is driven from the drive mechanism 2 is mounted through a bearing 114 in a sleeve 112 which is fixedly fitted at the center of a fixed plate 110 in the switch assembly 1, for linear reciprocating movement and angular rotational movement. A movable member 116 is fixedly mounted at the fore end of the rocking shaft 113, the movable member 116 securely supporting thereon a pair of U-shaped switch pipes 117a and 117b with the opposite open ends disposed opposingly to the switch ports of the conduit pipes 111a to 111d.

The fixed plate 110 constitutes a support structure for the automatic conduit switching mechanism along with the sleeve 112, which is mounted on the fixed plate 110, and a support plate 120 which is connected to the sleeve 112. Mounted on the support plate 120 is a dual actuator 121 which constitutes the drive mechanism 2.

The dual actuator 121 has a pneumatic cylinder 122 which is formed by interconnecting a front end plate 123, which is fixed on the support plate 120, and a rear end plate 124 which is located opposingly in face to face relation with the front end plate 123. Output shaft 127 which is projected from a piston 126 in the pneumatic cylinder 122 is connected at its fore end to the rocking shaft 113 at the center of the movable member 116 by means of a pin 128. The piston 126 is provided with a couple of guide rods 129 which are extended out of the cylinder slidably through the rear end plate 124 in parallel relation with the output shaft 127, thereby to permit axial sliding movement of the piston 126 while blocking rotational movements thereof. The front and rear end plates 123 and 124 are provided with ports 131 and 132, respectively, to supply compressed air into and out of the fluid cylinder 122.

Further, a vane type rotary rocking actuator 141 is provided in the piston 126. This rocking actuator 141 includes a cylindrical pressure chamber 142 receiving therein the output shaft 127, and a vane 144 provided on the output shaft 127 in such a manner as to impart a rocking movement to the output shaft 127 upon applying fluid pressure on one of the opposite faces of the vane 144. The output shaft 127 is led out of the piston 126 to form a piston rod, while an output shaft 143 is extended out of the cylinder in a direction away from the output shaft 127.

The guide rods 129, which is provided to permit only sliding movement of the piston 126 and to block its rotational movement, are in the form of hollow pipes internally providing compressed air passages 145 which are communicated with the opposite sides of the vane 144 in the pressure chamber 142 of the rocking actuator 141 for driving same.

Therefore, compressed air can be supplied to the rocking actuator 141 without necessitating provision of complicate air supply passages and conduits.

On the other hand, the output shaft 143 of the rocking actuator 141, which is protruded on the rear side away from the movable member 116, is led out of the cylinder through the rear end plate 124. As the output shaft 143 is put in rotational and linear movements with the movable member 116, the protruded rear end of the output shaft 143 can be utilized for detection of operational movements of the movable member 116. For this purpose, sensors 151 and 152 are mounted on the outer side of the fluid cylinder 122 to detect axial and rotational movements of the protruded rear end of the output shaft 143. In this particular embodiment, these sensors are constituted by approaching switches which are so located as to detect approach of actuator strips 153 and 154. The sensors 151, which detect an axial movement of the actuator strip 153 by the output shaft 143, are provided in positions corresponding to completely closing positions and open positions of the switch pipes 117a and 117b on the movable plate 116 relative to the switch ports of the conduit pipes 111a to 111d on the fixed plate 110, while the sensors 152, which detect a rotational operation of the actuator strip 154, are located at an angular interval of 90° correspondingly to the two switching positions of the movable member 116.

In this manner, the axial and rotational movements are detected by the sensors 152 in association with the protruded rear end of the output shaft 143. The collective location of the sensors 152 on the rear side of the apparatus facilitates the maintenance and service of the apparatus and provides operational stability in detecting the various positions in the switching operation.

The washer assembly, which serves to wash off dribbled liquid from the respective switch points, includes a coupler 161 which is coaxially threaded into one end of the rocking shaft 113 and which is provided with a plural number of radially opened nozzles 162. A washing liquid, which is supplied to the coupler 161 through a flexible washing liquid tube (not shown), is spurted through the nozzles 162 toward joints of the switch ports of the conduit pipes 111a to 111d and switch pipes 117a and 117b for a predetermined time period to wash off the liquid which had dribbled from the switch ports when opened.

Similarly to the first embodiment described above, the fixed plate 110 is also arranged to function as a partition plate which prevents intrusion of the washing liquid into the drive mechanism from the washer. A cover (not shown) is attached around the outer periphery of the fixed plate 110 in such a manner as to circumvent the pipe joints at the switch ports and the washer assembly. Further, rods 51 and stopper blocks 52 of the same construction as in the first embodiment are mounted on the movable member 116 and fixed plate 110, respectively.

Figure 12:
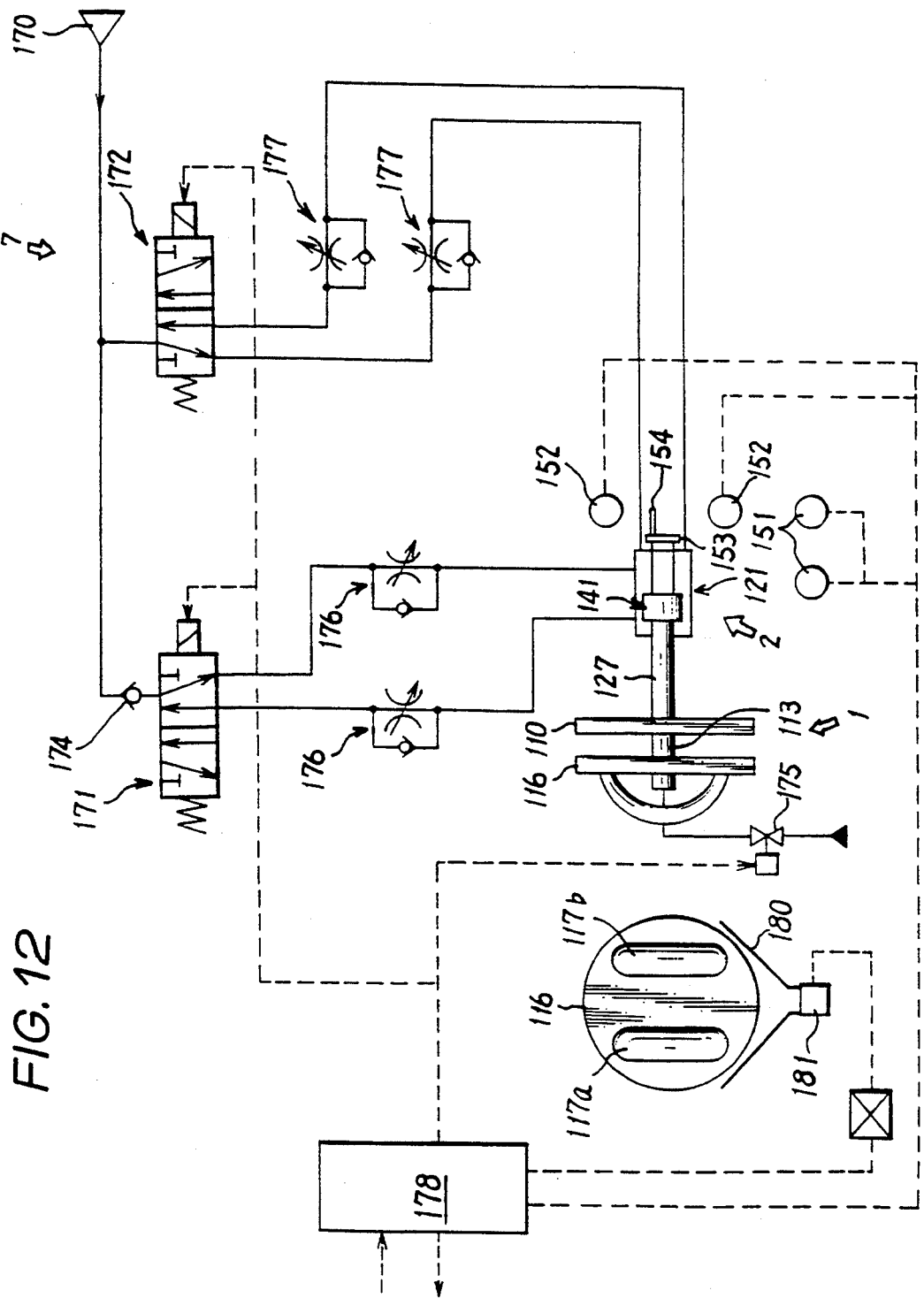
FIG. 12 is a diagram of a controller employed in the second embodiment.

Illustrated in FIG. 12 is a control system for the above-described automatic pipe switching apparatus. The control system which is generally indicated by reference 7 includes: a first direction change-over valve 171 which controls supply of compressed air from a pneumatic pressure source 170 to the fluid cylinder 122 of the dual actuator 121; a second direction change-over valve 172 which controls supply of compressed air to the rocking actuator 141 in the piston 126; a check valve 174 provided in a conduit which communicates the pneumatic pressure source 170 with an inlet port of the first direction change-over valve 171; an on-off valve 175 for supplying washing water; and speed controllers 176 and 177 provided in conduits which communicate outlet ports of the first and second direction change-over valves 171 and 172 with the dual actuator 121, respectively. These change-over valves are operated from a control panel 178 under programmed procedures. For example, the first and second direction change-over valves 171 and 172 may be constituted by a center-closed type three-position valve which closes all of its ports in neutral position.

In FIG. 12, the reference 180 denotes a drain trap, and the reference 181 a leak sensor.

The control system 7 for the automatic conduit switching apparatus is arranged to energize the solenoid of the first direction change-over valve 171 in response to an electric signal from the control panel 178, whereupon the valve 171 is switched to the position of FIG. 12 to move the output shaft 127 of the dual actuator 121 to the left in FIG. 11. As a result, the movable member 116 is moved away from the fixed plate 110, disengaging the switch pipes 117a and 117b on the movable member 116 from the conduit pipes 111a to 111d on the fixed plate 110 to open the switch ports on the latter.

As soon as the disengagement of the movable member 116 is detected by the sensor 151, the solenoid of the second direction change-over valve 172 is energized to turn the rocking actuator 141, turning the rocking shaft 113 and movable member 116 through 90° relative to the fixed plate 110.

Upon confirming the rotational shift of position of the movable member 116 through the sensor 152, the solenoid of the first direction change-over valve 171 is de-energized, whereupon the output shaft 127 of the dual actuator 121 and the rocking shaft 113 are moved to the right in FIG. 11 to close and connect the switch pipes to the conduit pipes in a switched position.

Thereafter, the on-off valve 175 is opened for a predetermined time period to spurt the washing liquid from a large number of nozzles 162 to wash off liquid dribbles which had come out of the coupling ports at the time of the preceding port-opening operation.

The dual actuator construction which has the rocking actuator 141 integrally formed within the fluid cylinder 122 is particularly effective in providing an apparatus of simplified and compact form.

Further, the supply of operating fluid through the guide rods 129 of the piston 126 also contribute to simplification of the fluid supply piping.

Furthermore, since the rocking actuator 141 which is attached to the center of the movable member 116 has the rear end of its output shaft 143 led out of the cylinder, the sensors 151 and 152 for detection of axial and rotational movements can be collectively mounted on the outwardly protruded rear end of the output shaft 143 to facilitate their maintenance and to ensure stabilized operation in detecting various operating positions of the apparatus.

What is claimed is:

1. An apparatus for automatically switching conduit pipes of a liquid treating plant, including a fixed plate supporting a plural number of conduit pipes thereon in communication with corresponding switch ports opened on one side of the fixed plate in spaced positions on a predetermined circle, a movable switch member supporting thereon U-shaped switch pipes with opposite open ends thereof in face to face relation with the switch ports on the fixed plate at predetermined switch points, and a drive mechanism having a drive shaft extended through the center of said circle of switch port positions on said fixed plate and adapted to drive said movable switch member for linear reciprocating movements toward and away from said fixed plate and either one of rotational and angular rocking movements about the axis of said drive shaft, switching connections between said conduit pipes by a combination of the linear reciprocating movements and rotational movements of said movable switch plate relative to said fixed plate, characterized in that said automatic switching apparatus comprises: a washer assembly mounted on the drive shaft and having a number of nozzles for spraying a washing liquid to wash said switch points; and a cover enclosing switch points on the side of said switch ports on said fixed plate; said drive mechanism having a fluid cylinder and a rotary actuator located on the other side of said fixed plate away from said switch ports to impart linear reciprocating movements and rotational movements to said movable member; said fixed plate also having a function as a partition wall for protecting said drive mechanism against intrusion of the washing liquid from said washer assembly.

2. An automatic conduit switching apparatus as defined in claim 1, wherein said drive mechanism comprises a fluid cylinder for imparting linear reciprocating movements to said movable member through a rocking shaft; and a rotary actuator for imparting angular rocking movements to said movable member.

3. An automatic conduit switching apparatus as defined in claim 1, wherein a flexible washing liquid supply tube is connected to the fore end of said rocking shaft, and a plural number of nozzles are provided in said rocking shaft to spurt the washing liquid toward said switch points.

4. An automatic conduit switching apparatus as defined in claim 1, wherein a cover is mounted on said fixed plate in such a manner as to enclose said switch points, said cover being provided with a gutter for collecting liquid leaks from said switch points and a leak sensor installed within said gutter.

5. An automatic conduit switching apparatus as defined in claim 1, further comprising a seal packing of L-shape in section provided at each switch point, said seal packing having a seal portion at the fore end of a cylindrical body for sealing closed switch point, and a radial bent portion formed integrally with said cylindrical body and adapted to be gripped between said switch pipe and a packing holder threaded on said switch pipe.

6. An automatic conduit switching apparatus as defined in claim 1, wherein said drive mechanism comprises a dual actuator having a reciprocating fluid cylinder, a hollow piston received in said fluid cylinder for axial sliding movement and blocked against rotational movement, said piston having an output shaft thereof connected to the center of said movable member, and a rotary actuator formed by providing a vane on said output shaft within said hollow piston to impart angular rocking movement to said movable member.

7. An automatic conduit switching apparatus as defined in claim 6, wherein said dual actuator further comprises a couple of guide rods extended into said piston in such a manner as to permit axial sliding movement of said piston while blocking rotational movement thereof, said guide rods being led out of said cylinder at the proximal ends thereof, and operating fluid passages formed in said guide rods for driving said rotary actuator.

8. An automatic conduit switching apparatus as defined in claim 6, wherein the output shaft of said rotary actuator, connected to the center of said movable member, is led out of said cylinder at the proximal end thereof, and sensors are provided in association with the proximal end of said output shaft for detection of operating positions in the axial and rotational directions thereof.

* * * * *